(12) United States Patent
Lainema

(10) Patent No.: US 11,223,849 B2
(45) Date of Patent: Jan. 11, 2022

(54) TRANSFORM SIGN COMPRESSION IN VIDEO ENCODING AND DECODING

(71) Applicant: Nokia Technologies Oy, Espoo (FI)

(72) Inventor: Jani Lainema, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/980,888

(22) PCT Filed: Mar. 12, 2019

(86) PCT No.: PCT/FI2019/050208
§ 371 (c)(1),
(2) Date: Sep. 15, 2020

(87) PCT Pub. No.: WO2019/185980
PCT Pub. Date: Oct. 3, 2019

(65) Prior Publication Data
US 2021/0067807 A1    Mar. 4, 2021

(30) Foreign Application Priority Data

Mar. 27, 2018  (FI) .................................... 20185285

(51) Int. Cl.
*H04N 19/61* (2014.01)
*H04N 19/172* (2014.01)
*H04N 19/176* (2014.01)
*H04N 19/18* (2014.01)
*H04N 19/184* (2014.01)

(52) U.S. Cl.
CPC .......... *H04N 19/61* (2014.11); *H04N 19/172* (2014.11); *H04N 19/176* (2014.11); *H04N 19/18* (2014.11); *H04N 19/184* (2014.11)

(58) Field of Classification Search
None
See application file for complete search history.

(56) References Cited

U.S. PATENT DOCUMENTS

2015/0103918 A1\*  4/2015  Wang ..................... H04N 19/18
                                                    375/240.24
2017/0142444 A1   5/2017  Henry

OTHER PUBLICATIONS

"Video Coding for Low Bit Rate Communication", Series H: Audiovisual And Multimedia Systems, Infrastructure of audiovisual services—Coding of moving Video, ITU-T Recommendation H.263, Jan. 2005, 226 pages.

(Continued)

*Primary Examiner* — Christopher G Findley
(74) *Attorney, Agent, or Firm* — Harrington & Smith

(57) ABSTRACT

There are disclosed various methods, apparatuses and computer program products for video decoding or encoding. In some embodiments the method for decoding or encoding comprises obtaining absolute values of at least a first transform coefficient and a second transform coefficient of a block of a picture (600); determining the sign of at least the first transform coefficient in the block (602); determining a reference measure based on at least said absolute value of the first transform coefficient and the determined sign of the first transform coefficient (604); determining a predicted sign for said second transform coefficient in the block (606); and decoding or encoding the sign of said second transform coefficient based on the determined predicted sign of said second transform coefficient (608).

20 Claims, 8 Drawing Sheets

(56) References Cited

OTHER PUBLICATIONS

"Advanced Video Coding for Generic Audiovisual Services", Series H: Audiovisual and Multimedia Systems, Infrastructure of audiovisual services—Coding of moving Video, Recommendation ITU-T H.264, Apr. 2017, 812 pages.

"High Efficiency Video Coding", Series H: Audiovisual and Multimedia Systems, Infrastructure of audiovisual services—Coding of moving video, Recommendation ITU-T H.265, Feb. 2018, 692 pages.

Rad et al., "An Efficient Sign Prediction Method for DCT Coefficients and its Application to Reversible Data Embedding in Scrambled JPEG Image", IEEE International Conference on Image Processing, Sep. 15-18, 2013, pp. 4442-4446.

Ponomarenko et al., "Prediction of Signs of DCT Coefficients in Block-based Lossy Image Compression", Proceedings of SPIE—The International Society for Optical Engineering 6497, Image Processing: Algorithms and Systems V, vol. 6497, Feb. 2007, pp. 64970L-1-64970L-8.

Koyama et al., "Coefficient Sign Bit Compression in Video Coding", Picture Coding Symposium, 2012, pp. 385-388.

Chen et al., Algorithm Description of Joint Exploration Test Model 6 (JEM 6), Joint Video Exploration Team (JVET) of ITU-T SG 16 WP 3 and ISO/IEC JTC 1/SC 29/WG 11, JVET-F1001, 6th Meeting, Mar. 31-Apr. 7, 2017, 50 pages.

Parameter Values for Ultra-High Definition Television Systems for Production and International Programme Exchange, Recommendation ITU-R BT.2020, Oct. 2015, 8 pages.

"Parameter Values for the HDTV Standards for Production and International Programme Exchange", Recommendation ITU-R BT.709-6, Jun. 2015, 19 pages.

Office action received for corresponding Finnish Patent Application No. 20185285, dated Nov. 23, 2018, 10 pages.

Lakhani, "Modifying JPEG Binary Arithmetic Codec for Exploiting Inter/Intra-Block and DCT Coefficient Sign Redundancies", IEEE Transactions on Image Processing, vol. 22, No. 4, Apr. 2013, pp. 1326-1339.

International Search Report and Written Opinion received for corresponding Patent Cooperation Treaty Application No. PCT/FI2019/050208, dated Jun. 6, 2019, 17 pages.

Moreno-Bernal et al., "Simulated Annealing Algorithm for 2D Image Compression", Ninth Electronics, Robotics and Automotive Mechanics Conference, 2012, pp. 129-134.

* cited by examiner

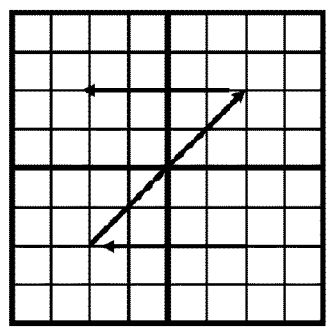 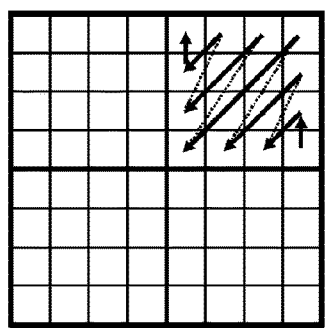 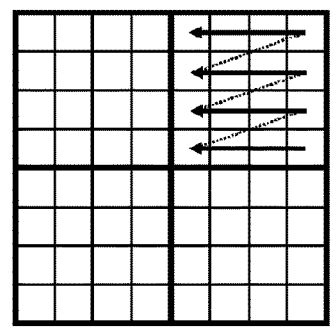
Fig. 8a  Fig. 8b  Fig. 8c
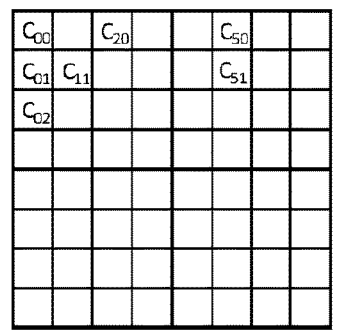 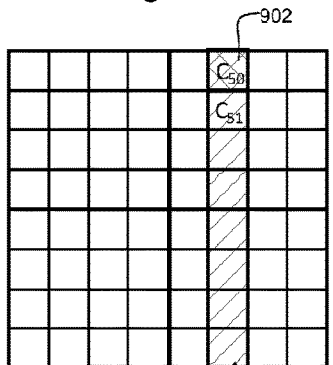 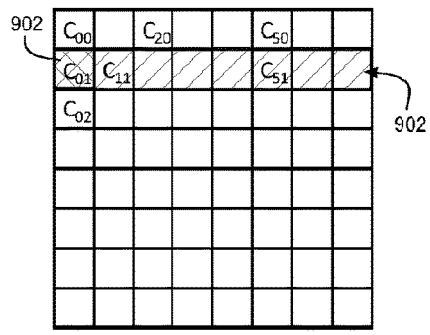
Fig. 9a  Fig. 9b  Fig. 9c

TRANSFORM SIGN COMPRESSION IN VIDEO ENCODING AND DECODING

RELATED APPLICATION

This application claims priority to PCT Application No. PCT/FI2019/050208, filed on March 12, 2019, which claims priority to FI Application No. 20185285, filed on Mar. 27, 2018, each of which is incorporated herein by reference in its entirety.

TECHNICAL FIELD

The present application relates generally to encoding and decoding of media presentations.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

SUMMARY

Some embodiments provide a method for encoding and decoding video information. In some embodiments an apparatus, a computer program product, a computer-readable medium for implementing the method are provided.

In accordance with an embodiment a method predicts transform coefficient signs within a transform block. A reference measure is generated based on determined impact functions and a set of decoded coefficients whose sign is already known and that measure is compared to two outputs of an impact function; one that has been generated with the current coefficient having a positive sign and one with the current coefficient having a negative sign. Predicted sign for a coefficient is selected based on the output of that comparison. An arithmetically coded bin may further be used to indicate whether the actual sign matches the predicted sign instead of indicating the actual sign in the bitstream. Alternatively, the arithmetic coding context for the sign bin can be selected based on the output of the comparison and the actual sign can be coded in the bitstream or decoded from the bitstream. A further alternative is provided to predict signs of residual samples in blocks where transform skip approach is used.

Various aspects of examples of the invention are provided in the detailed description.

According to a first aspect, there is provided a method comprising:

obtaining absolute values of at least a first transform coefficient and a second transform coefficient of a block of a picture;

determining the sign of at least the first transform coefficient in the block;

determining a reference measure based on at least said absolute value of the first transform coefficient and the determined sign of the first transform coefficient;

determining a predicted sign for said second transform coefficient in the block;

decoding or encoding the sign of said second transform coefficient based on the determined predicted sign of said second transform coefficient.

According to a second aspect, there is provided an apparatus comprising at least one processor; and at least one memory including computer program code the at least one memory and the computer program code configured to, with the at least one processor, cause the apparatus to perform at least the following:

obtain absolute values of at least a first transform coefficient and a second transform coefficient of a block of a picture;

determine the sign of at least the first transform coefficient in the block;

determine a reference measure based on at least said absolute value of the first transform coefficient and the determined sign of the first transform coefficient;

determine a predicted sign for said second transform coefficient in the block;

decode or encode the sign of said second transform coefficient based on the determined predicted sign of said second transform coefficient.

According to a third aspect, there is provided a computer readable storage medium stored with code thereon for use by an apparatus, which when executed by a processor, causes the apparatus to perform:

obtain absolute values of at least a first transform coefficient and a second transform coefficient of a block of a picture;

determine the sign of at least the first transform coefficient in the block;

determine a reference measure based on at least said absolute value of the first transform coefficient and the determined sign of the first transform coefficient;

determine a predicted sign for said second transform coefficient in the block;

decode or encode the sign of said second transform coefficient based on the determined predicted sign of said second transform coefficient.

According to a fourth aspect, there is provided an apparatus comprising:

means for obtaining absolute values of at least a first transform coefficient and a second transform coefficient of a block of a picture;

means for determining the sign of at least the first transform coefficient in the block;

means for determining a reference measure based on at least said absolute value of the first transform coefficient and the determined sign of the first transform coefficient;

means for determining a predicted sign for said second transform coefficient in the block;

means for decoding or encoding the sign of said second transform coefficient based on the determined predicted sign of said second transform coefficient.

BRIEF DESCRIPTION OF THE DRAWINGS

For a more complete understanding of example embodiments of the present invention, reference is now made to the following descriptions taken in connection with the accompanying drawings in which:

FIG. 8a illustrates an example of an 8×8 block of transform coefficients that is further divided into four 4×4 sub-groups;

FIG. 8b illustrates a diagonal scanning of coefficients within one of the sub-groups of FIG. 8a;

FIG. 8c illustrates another example of a horizontal scanning order for the coefficients within a sub-block;

FIG. 9a illustrates an example of a block of quantized coefficients the encoder is to code or the decoder is to decode, in accordance with an embodiment;

FIG. 9b illustrates an example of predicting and decoding the sign for a coefficient, in accordance with an embodiment;

FIG. 9c illustrates an example of predicting and decoding the sign for coefficient, in accordance with an embodiment;

DETAILED DESCRIPTION OF SOME EXAMPLE EMBODIMENTS

Figure 1:
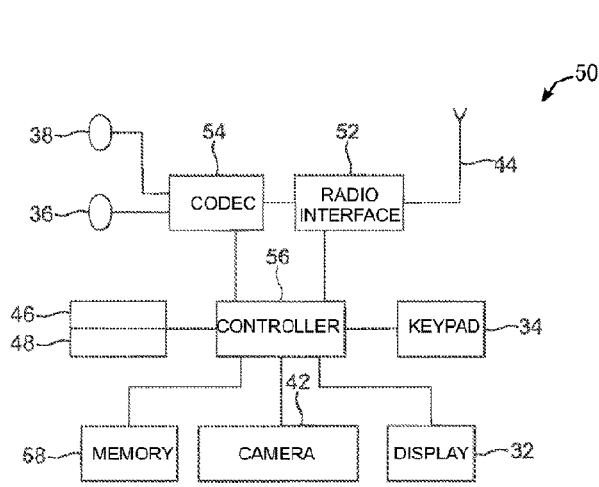
FIG. 1 illustrates a block diagram of a video coding system according to an embodiment.
Figure 2:
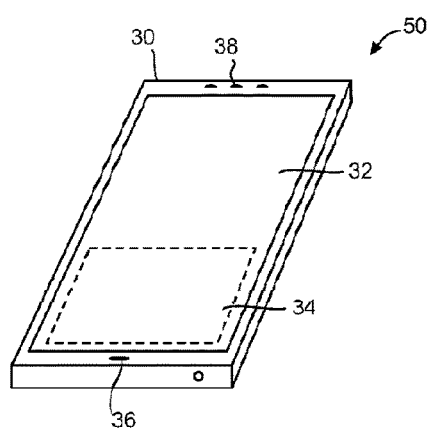
FIG. 2 illustrates a layout of an apparatus according to an embodiment.

FIG. 1 shows a video coding system as a schematic block diagram of an apparatus or electronic device 50 according to an embodiment. The electronic device 50 may incorporate a codec according to an embodiment. FIG. 2 shows a layout of an apparatus according to an embodiment. The elements of FIGS. 1 and 2 will be explained next.

The electronic device 50 may, for example, be a mobile terminal or user equipment of a wireless communication system. However, it is appreciated that embodiments of the invention may be implemented within any electronic device or apparatus which may perform encoding and decoding, or encoding or decoding video images.

The apparatus 50 may comprise a housing 30 for incorporating and protecting the device. The apparatus 50 may further comprise a display 32 in the form of a liquid crystal display. In other embodiments, the display may be any suitable display technology suitable to display an image or video. The apparatus 50 may further comprise a keypad 34. According to an embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which—according to an embodiment—may be any one of: an earpiece 38, speaker, or an analogue audio or digital audio output connection. The apparatus 50 may also comprise a battery 40 (or in an embodiment, the device may be powered by any suitable mobile energy device, such as solar cell, fuel cell or clockwork generator). The apparatus may further comprise a camera 42 capable of recording or capturing images and/or video. According to an embodiment, the apparatus 50 may further comprise an infrared port for short range line of sight communication to other devices. According to an embodiment, the apparatus 50 may further comprise any suitable short range communication solution such as for example a Bluetooth® wireless connection or a USB/firewire wired connection.

The apparatus 50 may comprise a controller 56 or processor for controlling the apparatus 50. The controller 56 may be connected to memory 58 which according to an embodiment may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller 56.

The apparatus 56 may further comprise a card reader 48 and a smart card 46, for example a UICC (Universal Integrated Circuit Card) and UICC reader for providing user information and being suitable for providing authentication information for authentication and authorization of the user at a network.

The apparatus 50 may further comprise a radio interface circuitry 52 connected to the controller and suitable for generating wireless communication signals for example for communication with a cellular communications network, a wireless communication system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

According to an embodiment, the apparatus 50 comprises a camera capable of recording or detecting individual frames which are then passed to the codec 54 or controller for processing. According to an embodiment, the apparatus may receive the video image data for processing from another device prior to transmission and/or storage. According to an embodiment, the apparatus 50 may receive either wirelessly or by a wired connection the image for coding/decoding.

Figure 3:
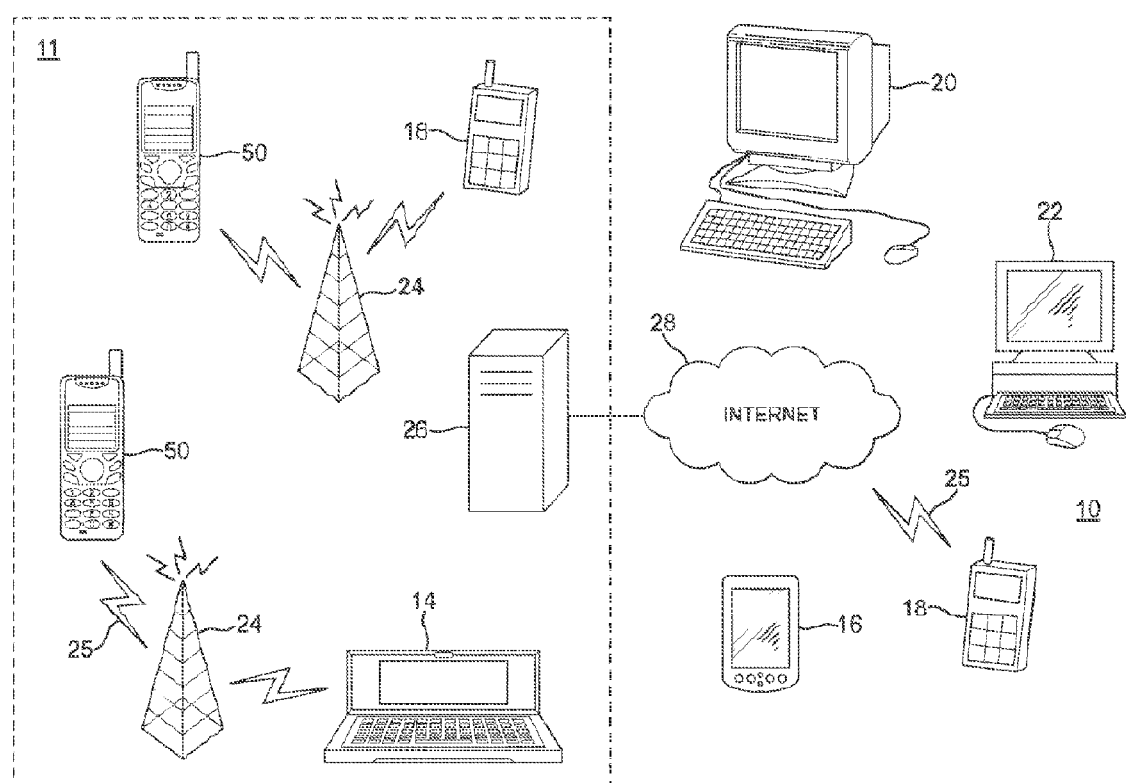
FIG. 3 illustrates an arrangement for video coding comprising a plurality of apparatuses, networks and network elements according to an embodiment.

FIG. 3 shows an arrangement for video coding comprising a plurality of apparatuses, networks and network elements according to an embodiment. With respect to FIG. 3, an example of a system within which embodiments of the invention can be utilized is shown. The system 10 comprises multiple communication devices which can communicate through one or more networks. The system 10 may comprise any combination of wired or wireless networks including but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network and the Internet.

The system 10 may include both wired and wireless communication devices or apparatus 50 suitable for implementing embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, any combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA) transmission control protocol-internet protocol (TCP-IP), short messaging service (SMS), multimedia messaging service (MMS) email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections and any suitable connection.

Video encoder may comprise an encoder that transforms the input video into a compressed representation suited for storage/transmission, and a decoder is able to uncompress the compressed video representation back into a viewable form. A video encoder and/or a video decoder may also be separate from each other, i.e. need not form a codec. The encoder may discard some information in the original video sequence in order to represent the video in more compact form (i.e. at lower bitrate).

Hybrid video codecs, for example ITU-T H.263 and H.264, may encode the video information in two phases. At first, pixel values in a certain picture are (or "block") are predicted for example by motion compensation means (finding and indicating an area in one of the previously coded video frames that corresponds closely to the block being coded) or by spatial means (using the pixel values around the block to be coded in a specified manner). Secondly, the prediction error, i.e. the difference between the predicted block of pixels and the original block of pixels, is coded. This may be done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size of transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

In block based image and video coding the sample prediction process may be limited to using the already encoded or decoded samples from left and above neighboring blocks as the below and right blocks are not yet processed at the time of processing the current block and thus not available as reference for the prediction process. This may lead to suboptimal in coding efficiency as in some case the right and below neighbors could provide better reference for sample prediction process than what is available in the top and left neighbors; or right and below neighbors could improve the accuracy of the prediction process if used together with the top and left neighbors.

The Advanced Video Coding (H.264/AVC a.k.a. AVC) standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was pre-published as ITU-T Recommendation H.265 (10/2014) and is likely to be published as Edition 2 of ISO/IEC 23008-2 in 2015. There are currently ongoing standardization projects to develop further extensions to H.265/HEVC, including three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles. A tier may be defined as specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

In some cases, a conformance point may be defined as a combination of a particular profile and a particular level or a combination of a particular profile, a particular tier, and a particular level. It needs to be understood that a conformance point may be defined in alternative ways, while its intent to specify characteristics and limits of bitstream and/or characteristics and (maximum) resources of decoders may be kept unchanged.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs may be signalled in the bitstream allowing the decoder to reproduce the intended structure of these units.

Figure 6:
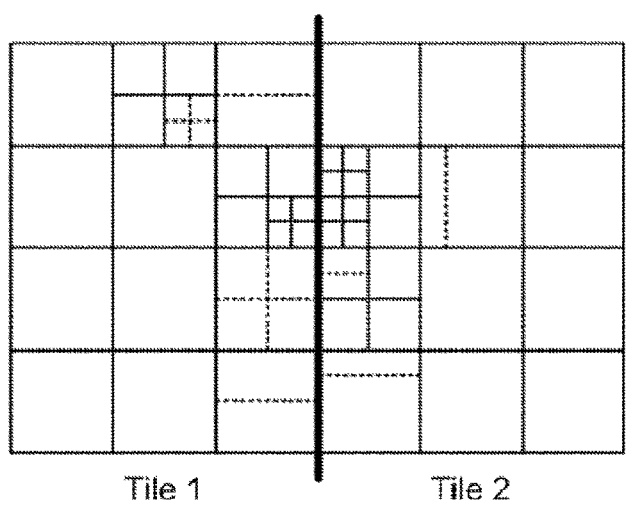
FIG. 6 shows an example of a picture consisting of two tiles.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan order and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order. FIG. 6 shows an example of a picture consisting of two tiles partitioned into square coding units (solid lines) which have been further partitioned into rectangular prediction units (dashed lines).

The decoder may reconstruct the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder may sum up the prediction and prediction error signals (pixel values) to form the output video frame. The decoder (and encoder) may also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

Instead, or in addition to approaches utilizing sample value prediction and transform coding for indicating the coded sample values, a color palette based coding may be used. Palette based coding refers to a family of approaches for which a palette, i.e. a set of colors and associated indexes, is defined and the value for each sample within a coding unit is expressed by indicating its index in the palette. Palette based coding can achieve good coding efficiency in coding units with a relatively small number of colors (such as image areas which are representing computer screen content, like text or simple graphics). In order to improve the coding efficiency of palette coding different kinds of palette index prediction approaches can be utilized, or the palette indexes can be run-length coded to be able to represent larger homogenous image areas efficiently. Also, in the case the CU contains sample values that are not recurring within the CU, escape coding can be utilized. Escape coded samples are transmitted without referring to any of the palette indexes. Instead their values are indicated individually for each escape coded sample.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, is typically constructed in two steps: First, an initial reference picture list is generated. The initial reference picture list may be generated for example on the basis of frame_num, POC, temporal_id (or TemporalId or alike), or information on the prediction hierarchy such as GOP structure, or any combination thereof. Second, the initial reference picture list may be reordered by reference picture list reordering (RPLR) commands, also known as reference picture list modification syntax structure, which may be contained in slice headers. In H.264/AVC, the RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. In HEVC, the initial reference picture lists may be modified through the reference picture list modification syntax structure, where pictures in the initial reference picture lists may be identified through an entry index to the list. In other words, in HEVC, reference picture list modification is encoded into a syntax structure comprising a loop over each entry in the final reference picture list, where each loop entry is a fixed-length coded index to the initial reference picture list and indicates the picture in ascending position order in the final reference picture list.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream in some inter coding modes or it may be derived (by an encoder and a decoder) for example using neighboring blocks in some other inter coding modes.

The motion information may be indicated in video codecs with motion vectors associated with each motion compensated image block. Each of these motion vectors may represent the displacement of the image block in the picture to be coded (in the encoder side) or decoded (in the decoder side) and the prediction source block in one of the previously coded or decoded pictures. In order to represent motion vectors efficiently, those vectors may be coded differentially with respect to block specific predicted motion vectors. In video codecs, the predicted motion vectors may be created in a predefined way, e.g. by calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector prediction. In addition to predicting the motion vector values, the reference index of a previously coded/decoded picture may be predicted. The reference index may be predicted e.g. from adjacent blocks and/or co-located blocks in a temporal reference picture. Moreover, high efficiency video codecs may employ an additional motion information coding/decoding mechanism, called "merging/merge mode", where all the motion field information, which may include motion vector and corresponding reference picture index for each available reference picture list, is predicted and used without any modification/correction. Similarly, predicting the motion field information may be carried out using the motion field information of adjacent blocks and/or co-located blocks in temporal reference pictures and the used motion field information is signaled among a list of motion field candidate list filled with motion field information of available adjacent/co-located blocks.

Some video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset may be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods may improve the coding efficiency substantially in presence of repeating structures within the frame—such as text or other graphics.

In video codecs, the prediction residual after motion compensation may be first transformed with a transform kernel (e.g. DCT) and then coded. The reason for this is that there may still exist some correlation among the residual and transform may in many cases help reduce this correlation and provide more efficient coding.

Video encoders may utilize Lagrangian cost functions to find optimal coding modes, e.g. the desired macroblock mode and associated motion vectors. This kind of cost function uses a weighting factor $\lambda$ (lambda) to tie together the (exact or estimated) image distortion due to lossy coding methods and the (exact or estimated) amount of information that is required to represent the pixel values in an image area:

$$C=D+\lambda R \quad (1)$$

Where C is the Lagrangian cost to be minimized, D is the image distortion (e.g. Mean Squared Error) with the mode and motion vectors considered, and R is the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level.

The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. The nuh_layer_id syntax element of HEVC may carry information on the scalability hierarchy.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, VCL NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. An IRAP picture in an independent layer contains only intra-coded slices. An IRAP picture belonging to a predicted layer with nuh_layer_id value currLayerId may contain P, B, and I slices, cannot use inter prediction from other pictures with nuh_layer_id equal to currLayerId, and may use inter-layer prediction from its direct reference layers. In the present version of HEVC, an IRAP picture may be a BLA picture, a CRA picture or an IDR picture. The first picture in the bitstream containing a base layer is an IRAP picture. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. There may be pictures in a bitstream that contain only intra-coded slices that are not RAP pictures. The IRAP picture belonging to a predicted layer with nuh_layer_id value currLayerId and all subsequent non-RASL pictures with nuh_layer_id equal to currLayerId in decoding order can be correctly decoded

| nal_unit_type | Name of nal_unit_type | Content of NAL unit and RBSP syntax structure |
| --- | --- | --- |
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved//reserved non-RAP non-reference VCL NAL unit types |
| 11, 13, 15 | RSV_VCL_R11 RSV_VCL_R13 RSV_VCL_R15 | Reserved//reserved non-RAP reference VCL NAL unit types |
| 16, 17, 18 | BLA_W_LP BLA_W_DLP (a.k.a. IDR_W_RADL) BLA_N_LP | Coded slice segment of a BLA picture slice_segment_layer_rbsp( ) |
| 19, 20 | IDR_W_DLP (a.k.a. IDR_W_RADL) IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22 . . . RSV_IRAP_VCL23 | Reserved//reserved RAP VCL NAL unit types |
| 24 . . . 31 | RSV_VCL24 . . . RSV_VCL31 | Reserved//reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, without performing the decoding process of any pictures with nuh_layer_id equal to currLayerId that precede the IRAP picture in decoding order, when the necessary parameter sets are available when they need to be activated and when the decoding of each direct reference layer of the layer with nuh_layer_id equal to currLayerId has been initialized (i.e. when LayerInitializedFlag[refLayerId] is equal to 1 for refLayerId equal to all nuh_layer_id values of the direct reference layers of the layer with nuh_layer_id equal to currLayerId).

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order may be decodable if random access is performed at the CRA picture, and hence clean random access may be achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture may either be a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture may contain syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise three parts, the base VPS, the VPS extension, and the VPS VUI, where the VPS extension and the VPS VUI may be optionally present. In HEVC, the base VPS may be considered to comprise the video_parameter_set_rbsp( ) syntax structure without the vps_extension( ) syntax structure. The video_parameter_set_rbsp( ) syntax structure was primarily specified already for HEVC version 1 and includes syntax elements which may be of use for base layer decoding. In HEVC, the VPS extension may be considered to comprise the vps_extension( ) syntax structure. The vps_extension( ) syntax structure was specified in HEVC version 2 primarily for multi-layer extensions and comprises syntax elements which may be of use for decoding of one or more non-base layers, such as syntax elements indicating layer dependency relations. The VPS VUI comprises syntax elements that may be useful for decoding or other purposes but are not required to be used in the HEVC decoding process.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Several nesting SEI messages have been specified in the AVC and HEVC standards or proposed otherwise. The idea of nesting SEI messages is to contain one or more SEI messages within a nesting SEI message and provide a mechanism for associating the contained SEI messages with a subset of the bitstream and/or a subset of decoded data. It may be required that a nesting SEI message contains one or more SEI messages that are not nesting SEI messages themselves. An SEI message contained in a nesting SEI message may be referred to as a nested SEI message. An SEI message not contained in a nesting SEI message may be referred to as a non-nested SEI message. The scalable nesting SEI message of HEVC enables to identify either a bitstream subset (resulting from a sub-bitstream extraction process) or a set of layers to which the nested SEI messages apply. A bitstream subset may also be referred to as a sub-bitstream.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit (AU) comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. In multi-layer HEVC, the value of NoRaslOutputFlag is equal to 1 for each IRAP picture when its nuh_layer_id is such that LayerInitializedFlag[nuh_layer_id] is equal to 0 and LayerInitializedFlag[refLayerId] is equal to 1 for all values of refLayerId equal to IdDirectRefLayer[nuh_layer_id][j], where j is in the range of 0 to NumDirectRefLayers[nuh_layer_id]−1, inclusive. Otherwise, the value of NoRaslOutputFlag is equal HandleCraAsBlaFlag. NoRaslOutputFlag equal to 1 has an impact that the RASL pictures associated with the IRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

In HEVC, a coded video sequence group (CVSG) may be defined, for example, as one or more consecutive CVSs in decoding order that collectively consist of an IRAP access unit that activates a VPS RBSP firstVpsRbsp that was not already active followed by all subsequent access units, in decoding order, for which firstVpsRbsp is the active VPS RBSP up to the end of the bitstream or up to but excluding the access unit that activates a different VPS RBSP than firstVpsRbsp, whichever is earlier in decoding order.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In HEVC, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0 (a.k.a. RefPicSetStCurrBefore), RefPicSetStCurr1 (a.k.a. RefPicSetStCurrAfter), RefPicSetStFoll0, RefPicSetStFoll1, RefPicSetLtCurr, and RefPicSetLtFoll. RefPicSetStFoll0 and RefPicSetStFoll1 may also be considered to form jointly one subset RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In HEVC, a reference picture set may be specified in a sequence parameter set and taken into use in the slice header through an index to the reference picture set. A reference picture set may also be specified in a slice header. A reference picture set may be coded independently or may be predicted from another reference picture set (known as inter-RPS prediction). In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

Scalable video coding may refer to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may consist of a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g. the motion and mode information of the enhancement layer may be predicted from lower layers. Similarly the pixel data of the lower layers may be used to create prediction for the enhancement layer.

A scalable video codec for quality scalability (also known as Signal-to-Noise or SNR) and/or spatial scalability may be implemented as follows. For a base layer, a conventional non-scalable video encoder and decoder are used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as a prediction reference for an enhancement layer, it is referred to as an inter-layer reference picture.

In addition to quality scalability, there may also be other scalability modes or scalability dimensions, which may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension. More generally, in hybrid codec scalability one or more layers may be coded according to one coding standard or specification and other one or more layers may be coded according to another coding standard or specification. For example, there may be two layers coded according to the MVC extension of H.264/AVC (out of which one is a base layer coded according to H.264/AVC), and one or more additional layers coded according to MV-HEVC. Furthermore, the number of coding standard or specifications according to which different layers of the same bitstream are coded might not be limited to two in hybrid codec scalability.

It should be understood that many of the scalability types may be combined and applied together. For example color gamut scalability and bit-depth scalability may be combined.

In the above scalability cases, base layer information may be used to code enhancement layer to minimize the additional bitrate overhead.

Scalability may be enabled in two ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame based scalability, approach can be implemented very efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

In order to be able to utilize parallel processing, images may be split into independently codable and decodable image segments (slices or tiles). Slices may refer to image segments constructed of certain number of basic coding units that are processed in default coding or decoding order, while tiles may refer to image segments that have been defined as rectangular image regions that are processed at least to some extend as individual frames.

In typical image and video coding applications blocks of samples are predicted by temporal and spatial means. If the prediction is not considered good enough on the basis of a selected cost function, a prediction error signal is coded in addition to the parameters describing the prediction process. Prediction error is calculated as the difference between original sample block and predicted sample block and typically transformed e.g. with DCT transform into a set of transform coefficients that are further quantized to a certain accuracy. The resulting quantized coefficients are transferred to the decoder and used to reconstruct the prediction error signal on the decoder side. In order to compress the transform coefficients describing the prediction error, those are typically scanned in a certain order and their amplitudes are coded with context based arithmetic coding. Typically, signs of those coefficients are coded without arithmetic coding as the statistics of the signs tend to be of seemingly random nature. Considering that these uncompressed sign bits may amount to 10-20% of a typical compressed image file, there is potential for tangible coding efficiency improvements if the sign bits can be efficiently predicted.

Figure 7:
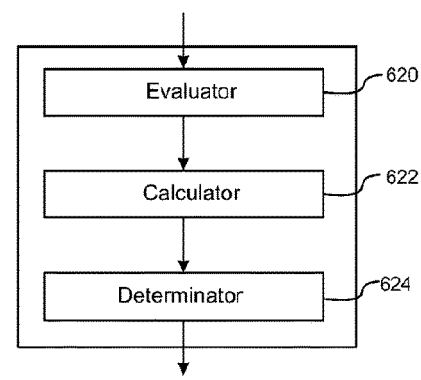
FIG. 7 illustrates a sign determination element as a simplified block diagram, in accordance with an embodiment.
Figure 10:
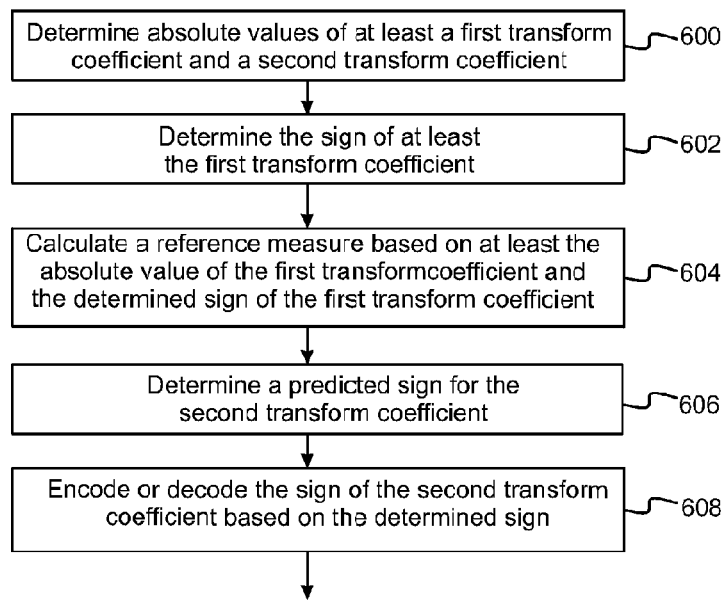
FIG. 10 illustrates a sign determining method according to an embodiment as a flowchart.

In the following, an embodiment for encoding a picture by a video encoder and decoding a picture by a video decoder will be described in more detail with reference to the flow diagram of FIG. 10, the block diagram of FIG. 7, and the examples of FIGS. 8a-8c and 9a-9c.

It should be noted that similar operation may be implemented both in the encoder and decoder. Hence, the elements depicted in the block diagram of FIG. 7 may be implemented both in the circuitry and/or software of the encoder and the decoder.

FIG. 8a depicts an 8×8 block of transform coefficients that is further divided into four 4×4 sub-groups. When encoding and decoding the coefficients, sub-groups may be scanned in a pre-defined order e.g. as shown in FIG. 8a i.e. first the lower right 4×4 sub-group, then the lower left 4×4 sub-group followed by the upper right 4×4 sub-group, and finally the upper left 4×4 sub-group, but the scanning order may also be different from that. The scanning order of the sub-groups may also be adaptive and depend e.g. on the sample prediction mode that has been selected for the block or the coding unit the block belongs to.

FIG. 8b depicts a diagonal scanning of coefficients within one of the sub-groups. Again, the order may depend e.g. on the selected sample prediction mode for the block.

FIG. 8c depicts another possible scanning order for the coefficients within a sub-block. In this example the coefficients are scanned in a horizontal order. It can be noted that in all the cases illustrated in FIGS. 8a through 8c the scanning of the coefficients results in all the coefficients below and to the right from the current coefficient to be scanned already before the scanning reaches the current coefficient.

In Step 600 an evaluator 620 determines absolute values of at least a first and a second transform coefficient in a block.

In Step 602 the evaluator 620 determines the sign of at least the first transform coefficient in the block.

In Step 604 a calculator 622 calculates a reference measure based on at least said absolute value of the first transform coefficient and the determined sign of the first transform coefficient.

In Step 606 the evaluator 620 determines a predicted sign for said second transform coefficient in a block. In accordance with an embodiment; determining the predicted sign comprises calculating a first updated measure based on said reference measure and assuming a positive value for said second transform coefficient; calculating a second updated measure based on said reference measure and assuming a negative value for said second transform coefficient; and performing at least one comparison involving said first updated measure and said second updated measure.

In Step 608 a sign determinator 624 decodes or encodes the sign of said second transform coefficient based on the determined predicted sign.

FIG. 9a depicts an example of a block of quantized coefficients the encoder is to code or the decoder is to decode. Cxy is used to denote a value of a non-zero coefficient at a location (x, y). The coefficients having a value of zero in this example are omitted from the figure.

FIG. 9b depicts predicting and decoding the sign for coefficient C50. As in an example embodiment, signs for coefficients with x coordinate larger that y coordinate a vertical prediction is used, the source coefficients for the prediction process are determined as being on the same column as C50, but below it (and thus preceding in decoding order). The locations of potential source coefficients is shown as a striped area in the block. It can be noted that the coefficients in the top-left sub-block are typically not yet decoded at the time of the decoding of coefficients in the sub-block if C50.

FIG. 9c depicts predicting and decoding the sign for coefficient C01. Now, according to an example embodiment, a horizontal prediction is applied as the y coordinate of the coefficient is larger than the x coordinate. In this example there are now two active coefficients C11 and C51 on the same row of coefficients with x coordinate larger than that of C01. Thus, both of these coefficients can be used to calculate a reference measure for C01.

The overall process for coefficient encoding or decoding can follow e.g. the processes defined for H.265 video coding standard by ITU-T recommendation H.265: "High efficiency video coding" or the Joint Exploration Model presented in the JVET document JVET-F1001, "Algorithm Description of Joint Exploration Test Model 6", Hobart, AU, April 2017. In both of these cases, a block of transform coefficients is further split down into sub-blocks of 4×4 transform coefficients. For each sub-block, the amplitudes and signs of coefficients are coded. In some configurations there may be sub-block level signaling if there are non-zero coefficients within a sub-block or not. The order of coding the sub-blocks and order of coding coefficients within a sub-block may vary and that can depend e.g. on the selected transform or the mode that was used to predict the coding block. Coding of the absolute values of the coefficients can be done e.g. having an arithmetically coded bin (flag) for each coefficient in an active sub-block that indicates if the coefficient has a nonzero value. In the case it has a non-zero value, there can be further indicators specifying the actual absolute value of the coefficient.

Determining the sign of at least the first transform coefficient in a block can be done in different ways. For example, the sign can be indicated by using an arithmetically coded bin or a by-pass mode bin (coded assuming an equal probability for positive and negative sign) or it can be done by sending a 1-bit identifier that specifies the sign. It can also potentially be hidden in the parity of the absolute values of some set of coefficients. According to one approach, the sign hiding process can code the sign of the last active coefficient (typically corresponding to the lowest frequency represented by active coefficients of that sub-group) in the scanning order in the sub-block, if the distance of the first and the last active coefficient in the scanning order in the sub-group is large enough. In this case, if the sum of the absolute values of the coefficients within a sub-group has an odd value the sign of that coefficient is determined to be negative, otherwise it is determined to be positive. It may be beneficial to determine the first sign instead of the last sign in the scanning order in a sub-group by sign hiding means, but any of the signs and any number of the signs can be determined with such a process.

Calculating the reference measure can also be done in different ways. In the case of a separable 2-dimensional transform, one possibility is to calculate an output value of a 1-dimensional inverse transform using only already decoded coefficients in the same row or column of the transform block than where the coefficient being decoded resides. The output value could advantageously be the lowest frequency output of the inverse transform, typically corresponding to the DC in the direction of the transform. In this case, the calculation of the reference measure R(x, y) for coefficient C(x, y) in an M×N block of transform coefficients where x belongs to [0, M−1] and y belongs to [0, N−1] may be done for a horizontal prediction as:

$$R_h(x,y) = \text{sum}[C(i,y)*T_M(i,0)], \text{ where } i \text{ goes from } x+1 \text{ to } M-1 \quad (1a)$$

Similarly, for a vertical prediction the reference measure can me defined as:

$$R_v(x,y) = \text{sum}[C(x,i)*T_N(i,0)], \text{ where } i \text{ goes from } y+1 \text{ to } N-1 \quad (1b)$$

In equations above $T_M(i, 0)$ is used to denote the component zero (first component) of the i'th basis function of an M point inverse transform used in decoding the residual samples. However, in other implementations different selections may be made. One practical approach would be to define a vertical impact function $I_v$ and a horizontal impact function $I_h$, store values of that function to both encoder and decoder and use that to determine the reference measures for horizontal and vertical prediction as:

$$R_h(x,y) = \text{sum}[C(i,y)*I_h(x,i)], \text{ where } i \text{ goes from } x+1 \text{ to } M-1 \quad (2a)$$

$$R_v(x,y) = \text{sum}[C(x,i)*I_v(y,i)], \text{ where } i \text{ goes from } y+1 \text{ to } N-1 \quad (2b)$$

The decision whether horizontal or vertical prediction is used may depend, for example, on the location of the coefficient which sign is being predicted or decoded. For example, if the y coordinate is larger than the x coordinate, the horizontal prediction can be used and otherwise the vertical prediction can be used. As another example, horizontal prediction may be used to the left-most coefficients of the block having x coordinate of value 0, vertical prediction may be used to the top-most coordinates having y coordinate of value 0, and otherwise, if both x and y coordinates are non-zero, the sign could be coded without prediction assuming equal probabilities.

It would also be possible to apply predictions in different directions or combining more than one prediction into one. For example, the reference measure could be calculated in a diagonal direction with a one dimensional impact function, or the reference measure can be calculated for a 2-dimensional area, such as:

$$R(x,y) = \text{sum}[C(i,j)*I(i,j)], \quad (3)$$

where i goes from x to M−1 and j goes from y to N−1, not including (i=x, j=y)

Calculating the updated measures can be done in different ways and may include also calculating absolute values of the results. Those may also include using the same impact functions that were used to calculate the reference measure. One example of calculating the updated measure for positive sign $U_{plus}$ an updated measure for negative sign $U_{minus}$ is based on the following equations:

$$U_{plus}(x,y) = \text{abs}(R(x,y) + C(x,y)*I(x,y)) \quad (4a)$$

$$U_{minus}(x,y) = \text{abs}(R(x,y) - C(x,y)*I(x,y)) \quad (4b)$$

In these equations (4a) and (4b), in the case of horizontal prediction the function R may refer to a horizontal reference measure $R_h$ and the function I to a horizontal impact function $I_h$. Similarly, for the vertical prediction the function R may refer to a vertical reference measure $R_v$ and the function I to a vertical impact function $I_v$.

The at least one comparison operation presented above in Step 606 may refer to e.g. a smaller than operation in which $U_{plus}(x, y)$ is compared with $U_{minus}(x, y)$ and deciding whether the predicted sign for a coefficient at transform coefficient at position (x, y) is a plus sign or a minus sign. If the comparison reveals that the value of the function $U_{plus}(x, y)$ is smaller than the value of the function $U_{minus}(x, y)$, the result is that the predicted sign is a plus sign. On the other hand, if the comparison reveals that the value of the function $U_{plus}(x, y)$ is greater than the value of the function $U_{minus}(x, y)$, the result is that the predicted sign is a minus sign. If the comparison reveals that the value of the function $U_{plus}(x, y)$ is equal to the value of the function $U_{minus}(x, y)$, the result is that the sign is predicted with equal propability.

In a pseudo code an example comparison and decoding of the sign can be written for example as follows. In the pseudo code an identifier uPlus is assigned with the value of $U_{plus}(x, y)$ and an identifier uMinus is assigned with the value of $U_{minus}(x, y)$:

```
If uPlus < uMinus
    signPrediction = +1
else if uMinus < uPlus
    signPrediction = -1
else
    signPrediction = 0
endif
if signPrediction == 0
    sign = decodeSignWithEqualProbability( )
else
    signSymbol = arithmeticDecodingOfSignSymbol( )
    if signSymbol == 1
        sign = signPrediction
    else
        sign = -signPrediction
    endif
endif
```

In this pseudo code a decodeSignWithEqualProbability( ) decodes and returns a sign of the coefficient that has been coded with equal probabilities, such as using a by-pass coding or equal probability setting of and arithmetic coding engine. Whereas, arithmeticDecodingOfSignSymbol( ) returns an arithmetically decoded symbol representing whether the actual sign is the predicted one or if the actual sign is the opposite sign to the predicted one. Here, the arithmetic coding engine could use different contexts based on different available supplemental information—such as whether horizontal or vertical prediction was applied, what is the location of the transform coefficient within a block, what kind of a prediction or transform was used for the block, etc.

An example of an alternative approach could, instead of decoding a signSymbol, decode directly the sign, but using a different context (probability state) for the arithmetic decoding. In this example the pseudo code could be modified as follows:

```
If uPlus < uMinus
    signPrediction = +1
else if uMinus < uPlus
    signPrediction = -1
else
    signPrediction = 0
endif
if signPrediction == 0
    sign = decodeSignWithEqualProbability( )
else if signPrediction == +1
    sign = arithmeticDecodingOfSignSymbol(using context 0)
else if signPrediction == -1
    sign = arithmeticDecodingOfSignSymbol(using context 1)
endif
```

The prediction and decoding part could naturally be combined into one to achieve more compact representation. In the case of the above example that kind of an implementation could be represented in pseudo code as:

```
If uPlus < uMinus
    sign = arithmeticDecodingOfSignSymbol(using context 0)
else if uMinus < uPlus
    sign = arithmeticDecodingOfSignSymbol(using context 1)
else
    sign = decodeSignWithEqualProbability( )
endif
```

Alternately, in the case of using signSymbol like approach, the pseudo code could be as follows:

```
If uPlus == uMinus
    sign = decodeSignWithEqualProbability( )
else
    signSymbol = arithmeticDecodingOfSignSymbol( )
    if uMinus < uPlus
        signSymbol = inverse(signSymbol)
    endif
    if signSymbol == 1
        sign = -1
    else
        sign = +1
    endif
endif
```

In the last example above the uMinus <uPlus comparison is used to determine if the signSymbol is inverted or not, which is effectively identical to the first example where based on the signSymbol the output sign is inverted or not.

In accordance with an embodiment, sign prediction can be applied to all or some subsets of coefficients of a block. For example, it could be applied only on certain rows of coefficients on the top of the transform block or certain columns of coefficients on the left border of the transform block. These coefficients represent lowest frequency horizontal coefficients and lowest frequency vertical coefficients. For example, it could be applied for only one row and column or four rows and columns. It could also applied, for example, only to the top-most non-zero coefficient in a column in the case of vertical prediction; or to the left-most non-zero coefficient in a row in the case of horizontal prediction.

The coefficients used in reference measure calculations in Step 604 can be limited to a certain subset of the block and can also depend on the location or the coefficient which sign is predicted or other characteristics. For example, in order to lower computational requirements of the method, for example only coefficients on certain rows or columns of the transform block could be included in the calculation. Similarly, the number of coefficients used in the calculation could be limited. For example, only the first non-zero coefficient or the first two non-zero coefficients found in the direction of prediction can be included in the calculation.

The magnitudes (absolute values) of coefficients can be used to determine whether those are included in the reference measure calculations in Step 604. For example, only the coefficient with the largest magnitude on a column or a row could be included in the calculation.

More than one columns of coefficients may be used for reference measure calculation in Step 604 in the case of vertical prediction and more than one rows of coefficients can be used for reference measure calculation in Step 604 in the case of horizontal prediction.

Prediction can be done in two directions instead of or in addition to a single direction. For example, the reference measures calculated in Step 604 in both directions can be summed up or one of those can be selected based on determined conditions.

Calculations may be defined differently for different transforms and the prediction process can be switched off for certain transforms and only applied to a sub-set of those.

Reference measures and updated measures can be calculated in different ways. For example, those can either be linear or non-linear functions of the encoded or decoded coefficient values. As a further example a neural network with already decoded coefficient values as an input can be used to calculate the reference and/or updated measures.

The amount and location of the coefficients that are sign predicted or that are used in calculation of the reference measures, or other configurable aspects of the method may depend on various parameters; such as dimensions of the transform block, type of the transform used, color channel of the transform, prediction methods used to predict the samples of the block, etc.

Impact functions can be defined in various ways. For example, parameters derived from the basis functions of the used transform can be used or those functions can be pre-defined for different transforms. The impact functions can also be adapted during the decoding operation to allow those to match better with the statistics of the decoded data In the following, some details of an alternative embodiment will be shortly described. In modern video codecs the transform coding may be sometimes skipped and residual signal may be coded as differential sample values. In this kind of mode of operation signs of the transform skipped samples may be predicted using spatial means. A predictor for a sign could be assigned based on, for example, the sign of the previous one or previous two non-zero samples in the coding order of the samples. In this kind of an example, instead of decoding sign directly, the decoder can be configured to decode sign symbols that indicate whether the sign is identical to the sign of the previous decoded sample, or is the sign obtained by inverting the predicted sign. Instead of or in addition to using the samples in the scanning order the samples in the spatial neighborhood could be used. For example, if one of the already decoded samples next to the current sample in horizontal, vertical or diagonal direction is available, that could be used as the primary predictor and if no such samples are available the latest sample in the scanning order could be used as a predictor. In this kind of an approach the sign prediction process can thus be expressed without calculating reference measures discussed above.

Figure 4:
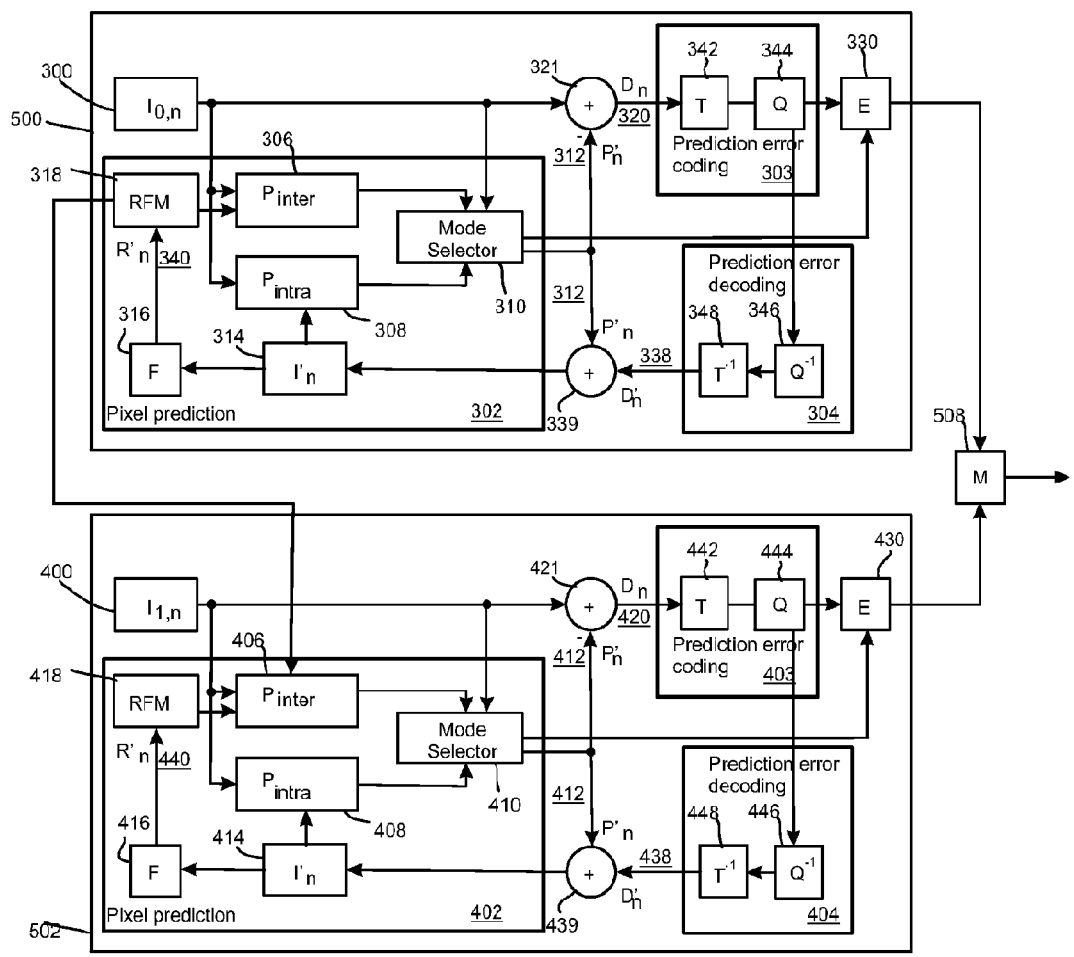
FIG. 4 illustrates a block diagram of a video encoder according to an embodiment.

FIG. 4 shows a block diagram of a video encoder in accordance with an embodiment. FIG. 4 presents an encoder for two layers, but it would be appreciated that presented encoder could be similarly extended to encode more than two layers, or only one layer. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current coding unit, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Figure 5:
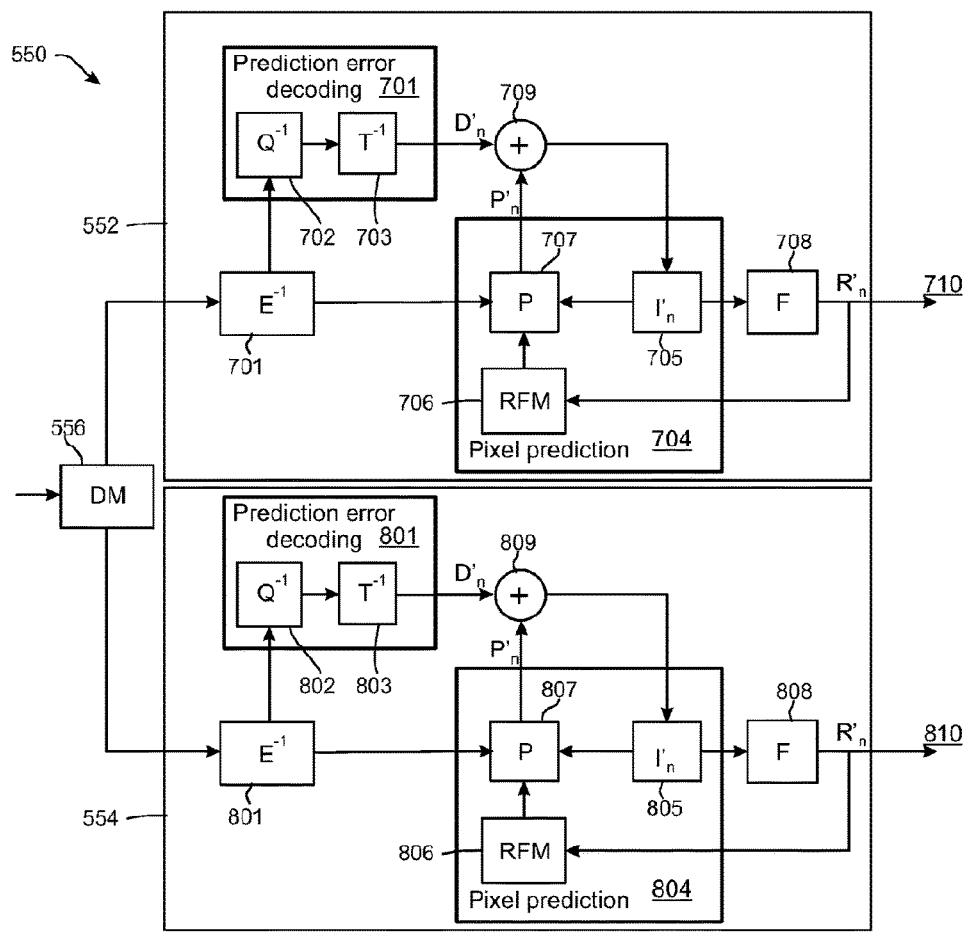
FIG. 5 illustrates a block diagram of a video decoder according to an embodiment.

In a decoder, similar operations may be performed to reconstruct samples of a block. FIG. 5 shows a block diagram of a video decoder in accordance with an embodiment. FIG. 5 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate pixel prediction operations. Blocks 705, 805 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 706, 806 illustrate a reference frame memory (RFM). Blocks 707, 807 illustrate prediction (P) (either inter prediction or intra prediction). Blocks 708, 808 illustrate filtering (F). Blocks 709, 809 may be used to combine decoded prediction error information with predicted base view/non-base view components to obtain the preliminary reconstructed images 705, 805 (I'n). Preliminary reconstructed and filtered base view images may be output 710 from the first decoder section 552 and preliminary reconstructed and filtered base view images may be output 810 from the first decoder section 554.

Figure 11:
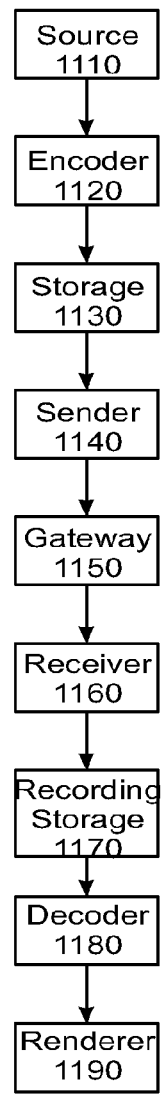
FIG. 11 shows a schematic diagram of an example multimedia communication system within which various embodiments may be implemented.

FIG. 11 is a graphical representation of an example multimedia communication system within which various embodiments may be implemented. A data source 1110 provides a source signal in an analog, uncompressed digital, or compressed digital format, or any combination of these formats. An encoder 1120 may include or be connected with a pre-processing, such as data format conversion and/or filtering of the source signal. The encoder 1120 encodes the source signal into a coded media bitstream. It should be noted that a bitstream to be decoded may be received directly or indirectly from a remote device located within virtually any type of network. Additionally, the bitstream may be received from local hardware or software. The encoder 1120 may be capable of encoding more than one media type, such as audio and video, or more than one encoder 1120 may be required to code different media types of the source signal. The encoder 1120 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1120 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1130. The storage 1130 may comprise any type of mass memory to store the coded media bitstream. The format of the coded media bitstream in the storage 1130 may be an elementary self-contained bitstream format, or one or more coded media bitstreams may be encapsulated into a container file. If one or more media bitstreams are encapsulated in a container file, a file generator (not shown in the figure) may be used to store the one more media bitstreams in the file and create file format metadata, which may also be stored in the file. The encoder 1120 or the storage 1130 may comprise the file generator, or the file generator is operationally attached to either the encoder 1120 or the storage 1130. Some systems operate "live", i.e. omit storage and transfer coded media bitstream from the encoder 1120 directly to the sender 1140. The coded media bitstream may then be transferred to the sender 1140, also referred to as the server, on a need basis. The format used in the transmission may be an elementary self-contained bitstream format, a packet stream format, or one or more coded media bitstreams may be encapsulated into a container file. The encoder 1120, the storage 1130, and the server 1140 may reside in the same physical device or they may be included in separate devices. The encoder 1120 and server 1140 may operate with live real-time content, in which case the coded media bitstream is typically not stored permanently, but rather buffered for small periods of time in the content encoder 1120 and/or in the server 1140 to smooth out variations in processing delay, transfer delay, and coded media bitrate.

The server 1140 may send the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1140 encapsulates the coded media bitstream into packets. For example, when RTP is used, the server 1140 encapsulates the coded media bitstream into RTP packets according to an RTP payload format. Typically, each media type has a dedicated RTP payload format. It should be again noted that a system may contain more than one server 1140, but for the sake of simplicity, the following description only considers one server 1140.

If the media content is encapsulated in a container file for the storage 1130 or for inputting the data to the sender 1140, the sender 1140 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The server 1140 may or may not be connected to a gateway 1150 through a communication network. The gateway may also or alternatively be referred to as a middle-box. It is noted that the system may generally comprise any number gateways or alike, but for the sake of simplicity, the following description only considers one gateway 1150. The gateway 1150 may perform different types of functions, such as caching packets, streams or resources, pre-fetching media data pro-actively, translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1150 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes or other devices that forward broadcast transmissions locally to home wireless networks. When RTP is used, the gateway 1150 may be called an RTP mixer or an RTP translator and may act as an endpoint of an RTP connection. Instead of or in addition to the gateway 1150, the system may include a splicer which concatenates video sequence or bitstreams.

The system includes one or more receivers 1160, typically capable of receiving, de-modulating, and de-capsulating the transmitted signal into a coded media bitstream. The coded media bitstream may be transferred to a recording storage 1170. The recording storage 1170 may comprise any type of mass memory to store the coded media bitstream. The recording storage 1170 may alternatively or additively comprise computation memory, such as random access memory. The format of the coded media bitstream in the recording storage 1170 may be an elementary self-contained bitstream format, or one or more coded media bitstreams may be encapsulated into a container file. If there are multiple coded media bitstreams, such as an audio stream and a video stream, associated with each other, a container file is typically used and the receiver 1160 comprises or is attached to a container file generator producing a container file from input streams. Some systems operate "live," i.e. omit the recording storage 1170 and transfer coded media bitstream from the receiver 1160 directly to the decoder 1180. In some systems, only the most recent part of the recorded stream, e.g., the most recent 10-minute excerption of the recorded stream, is maintained in the recording storage 1170, while any earlier recorded data is discarded from the recording storage 1170.

The coded media bitstream may be transferred from the recording storage 1170 to the decoder 1180. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1170 or a decoder 1180 may comprise the file parser, or the file parser is attached to either recording storage 1170 or the decoder 1180. It should also be noted that the system may include many decoders, but here only one decoder 1170 is discussed to simplify the description without a lack of generality The coded media bitstream may be processed further by a decoder 1170, whose output is one or more uncompressed media streams. Finally, a renderer 1190 may reproduce the uncompressed media streams with a loudspeaker or a display, for example. The receiver 1160, recording storage 1170, decoder 1170, and renderer 1190 may reside in the same physical device or they may be included in separate devices.

In the above, some embodiments have been described in relation to terms representation and/or bitstream. It needs to be understood that embodiments may be similarly be described in relation to similar terms, e.g. a representation instead of a bitstream, a bitstream instead of a representation, or an elementary stream instead of a bitstream or a representation.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. The computer software may cause the relevant apparatuses, such as encoder or decoder, to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

The various embodiments can be implemented with the help of a non-transitory computer-readable medium encoded with instructions that, when executed by a computer, perform the various embodiments.

If desired, the different functions discussed herein may be performed in a different order and/or concurrently with each other. Furthermore, if desired, one or more of the above-described functions may be optional or may be combined. Furthermore, the present embodiments are disclosed in relation to a method for decoding and to a decoder. However, the teachings of the present disclosure can be applied in an encoder configured to perform encoding of coding units and coding the indication the presence of escape coding within the coding unit.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The embodiments may provide some advantages. For example, accuracy of the motion compensated prediction may be improved by providing a bitrate efficient way of signaling additional information required to model higher order motion vector fields.

The invention claimed is:

1. A method comprising:
   obtaining absolute values of at least a first transform coefficient and a second transform coefficient of a block of a picture;
   determining a sign of at least the first transform coefficient in the block;
   determining a reference measure based on at least said absolute value of the first transform coefficient and the determined sign of the first transform coefficient;
   determining a predicted sign for said second transform coefficient in the block using at least the obtained absolute values of at least the first transform coefficient and the second transform coefficient of the block of the picture; and
   decoding or encoding the sign of said second transform coefficient based on the determined predicted sign of said second transform coefficient.

2. The method according to claim 1 further comprising:
   calculating a first updated measure based on the reference measure and using a positive value for said second transform coefficient, the positive value for said second transform coefficient determined with applying a positive factor to the absolute value of the second transform coefficient;
   calculating a second updated measure based on the reference measure and using a negative value for said second transform coefficient, the negative value for said second transform coefficient determined with applying a negative factor to the absolute value of the second transform coefficient; and
   determining the predicted sign for said second transform coefficient in the block with performing at least one comparison involving said first updated measure and said second updated measure.

3. The method according to claim 1, wherein said obtaining the absolute values comprises one of the following:
   receiving the absolute values as an array of values associated with different coefficients;
   receiving the absolute values along with a bitstream; or
   decoding the absolute values from the bitstream.

4. The method according to claim 1 wherein the reference measure is a function of values of coefficients on a same row or column as said second coefficient.

5. The method according to claim 4 further comprising selecting between a row or a column based on coordinates or location of the second coefficient.

6. The method according to claim 1 further comprising:
   processing the block of the picture as two or more subsets of coefficients; and
   applying the sign prediction only to a part of the subsets of coefficients of the block.

7. The method according to claim 1 further comprising:
   determining said reference measure as a first reference measure determined on the basis of coefficients of one or more columns of the block and as a second reference measure determined on the basis of coefficients of one or more rows of the block; and
   combining the first reference measure and the second reference measure to form the reference measure.

8. An apparatus comprising:
   at least one processor; and
   at least one non-transitory memory including computer program code;
   the at least one memory and the computer program code configured to, with the at least one processor, cause the apparatus at least to:
   obtain absolute values of at least a first transform coefficient and a second transform coefficient of a block of a picture;
   determine a sign of at least the first transform coefficient in the block;

determine a reference measure based on at least said absolute value of the first transform coefficient and the determined sign of the first transform coefficient;

determine a predicted sign for said second transform coefficient in the block using at least the obtained absolute values of at least the first transform coefficient and the second transform coefficient of the block of the picture; and decode or encode the sign of said second transform coefficient based on the determined predicted sign of said second transform coefficient.

9. The apparatus according to claim 8, wherein the apparatus is further caused to:

calculate a first updated measure based on the reference measure and using a positive value for said second transform coefficient, the positive value for said second transform coefficient determined with applying a positive factor to the absolute value of the second transform coefficient;

calculate a second updated measure based on the reference measure and using a negative value for said second transform coefficient, the negative value for said second transform coefficient determined with applying a negative factor to the absolute value of the second transform coefficient; and determine the predicted sign for said second transform coefficient in the block with performing at least one comparison involving said first updated measure and said second updated measure.

10. The apparatus according to claim 8, where said obtaining the absolute values comprises one of the following:

obtaining the absolute values as an array of values associated with different coefficients;

receiving the absolute values along with a bitstream;

decoding the absolute values from the bitstream.

11. The apparatus according to claim 8 where:

the reference measure is a function of values of coefficients on a same row or column as said second coefficient.

12. The apparatus according to claim 11 where:

the selection between row or a column depends on the coordinates or the location of the second coefficient.

13. The apparatus according to claim 8, wherein the apparatus is further caused to:

process the block of the picture as two or more subsets of coefficients; and apply the sign prediction only to a part of the subsets of coefficients of the block.

14. The apparatus according to any of the claim 8, wherein the apparatus is further caused to:

determine said reference measure as a first reference measure determined on the basis of coefficients of one or more columns of the block and as a second reference measure determined on the basis of coefficients of one or more rows of the block; and combine the first reference measure and the second reference measure to form the reference measure.

15. A non-transitory computer readable medium comprising program instructions for causing an apparatus to perform at least the following:

obtain absolute values of at least a first transform coefficient and a second transform coefficient of a block of a picture;

determine a sign of at least the first transform coefficient in the block;

determine a reference measure based on at least said absolute value of the first transform coefficient and the determined sign of the first transform coefficient;

determine a predicted sign for said second transform coefficient in the block using at least the obtained absolute values of at least the first transform coefficient and the second transform coefficient of the block of the picture;

decode or encode the sign of said second transform coefficient based on the determined.

16. The computer readable medium according to claim 15, comprising program instructions for causing the apparatus to further perform the following:

calculate a first updated measure based on the reference measure and using a positive value for said second transform coefficient, the positive value for said second transform coefficient determined with applying a positive factor to the absolute value of the second transform coefficient;

calculate a second updated measure based on the reference measure and using a negative value for said second transform coefficient, the negative value for said second transform coefficient determined with applying a negative factor to the absolute value of the second transform coefficient; and determine the predicted sign for said second transform coefficient in the block with performing at least one comparison involving said first updated measure and said second updated measure.

17. The computer readable medium according to claim 15, wherein said obtaining the absolute values comprises one of the following:

obtaining the absolute values as an array of values associated with different coefficients;

receiving the absolute values along with a bitstream; or decoding the absolute values from the bitstream.

18. The computer readable medium according to claim 15 where:

the reference measure is a function of values of coefficients on a same row or column as said second coefficient.

19. The computer readable medium according to claim 15 where:

the selection between row or a column depends on the coordinates or the location of the second coefficient.

20. The computer readable medium according to claim 15, comprising program instructions for causing the apparatus to further perform the following:

process the block of the picture as two or more subsets of coefficients; and apply the sign prediction only to a part of the subsets of coefficients of the block.

* * * * *